Nov. 29, 1966 I. M. McNAIR, JR., ET AL 3,288,945
APPARATUS FOR VISUALLY IDENTIFYING CONDUCTOR PAIRS IN A MULTICONDUCTOR TELEPHONE CABLE WITH MULTIDIGITAL NUMBERS
Filed Oct. 10, 1963
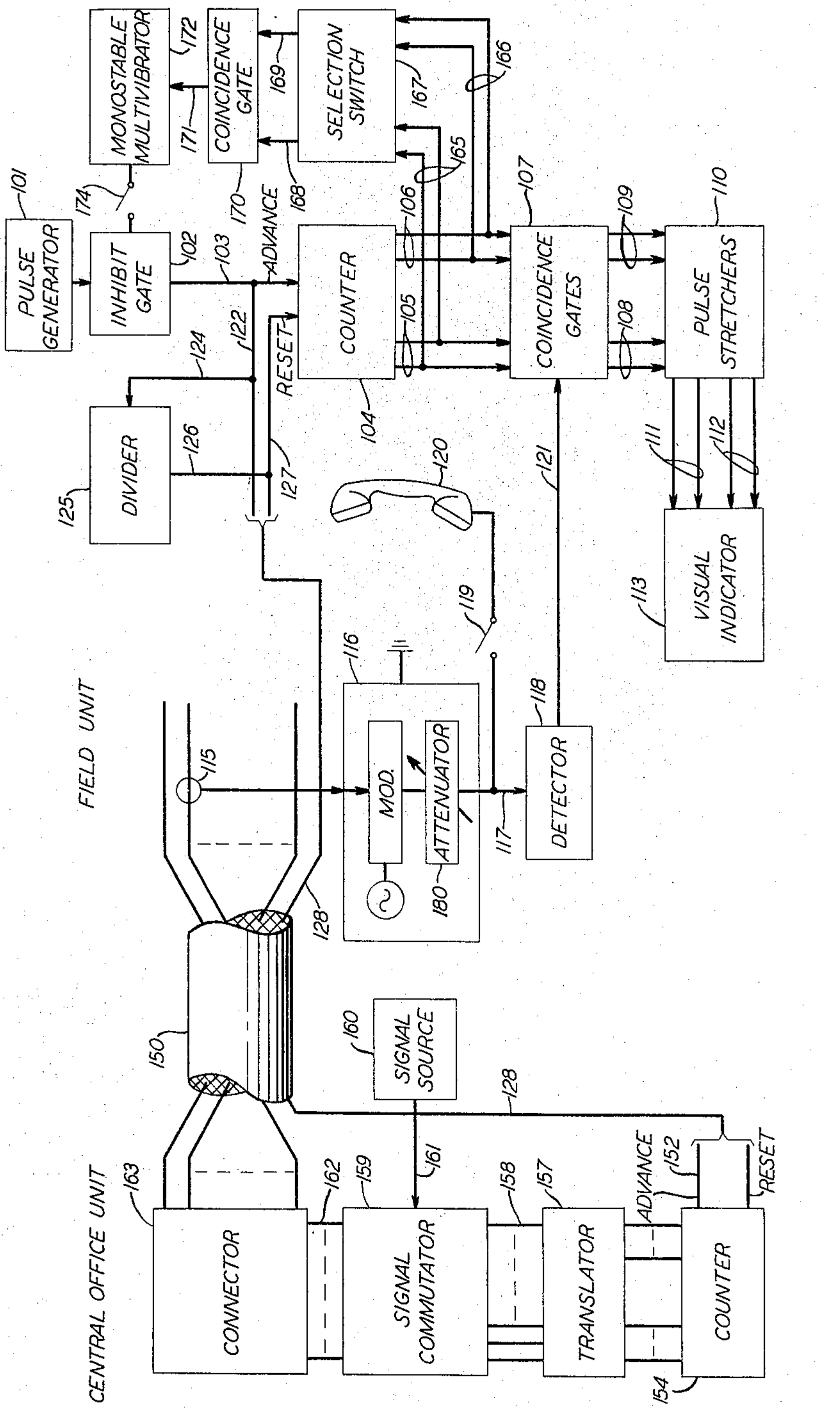
INVENTORS: I. M. McNAIR, JR.
C. A. YOUNG
BY R. O. Nimtz
ATTORNEY United States Patent Office 3,288,945

Patented Nov. 29, 1966

3,288,945

APPARATUS FOR VISUALLY IDENTIFYING CONDUCTOR PAIRS IN A MULTICONDUCTOR TELEPHONE CABLE WITH MULTIDIGITAL NUMBERS

Irving M. McNair, Jr., and Charles A. Young, Scotch Plains, N.J., assignors to Bell Telephone Laboratories, Incorporated, New York, N.Y., a corporation of New York Filed Oct. 10, 1963, Ser. No. 315,131

11 Claims. (Cl. 179—175.3)

This invention relates to the identification of conductors in a multiconductor cable and, more particularly, to the automatic identification of conductor pairs in a telephone exchange cable.

A telephone cable, used to connect subscribers from some remote location to a central office, is generally made up of a large number of insulated pairs of conductors which are twisted together. These conductors are all contained within a single protective sheath. Each of the conductor pairs connects a particular subscriber to a terminal on a main frame at the central office. Each conductor pair at the end of a cable in the field must, therefore, be identified in terms of its corresponding connection to the main frame at the central office.

Identification of the conductor pairs is, at present, conducted manually. Two workmen are stationed, respectively, at the central office and the field end of the cable. The man in the central office applies an audible signal to each of the conductor pairs. He communicates the identity of each energized pair to the man in the field at the time the signal is applied. The man in the field has an electrical probe connected to an audio detector. As the man in the field is informed as to the identity of an energized pair, he manually scans the conductor pairs of the cable to find the energized pair. He puts an identification marker on that pair and notifies the man at the central office of the identification. This procedure is continued until all of the conductor pairs have been identified. Apparatus to perform this type of identification is disclosed in Fisher-Parker Patent 2,133,384, issued October 18, 1938.

There also presently exists an identification system that permits a single operator to identify the conductor pairs. Such a system usually comprises some dial pulse controlled, electromechanical selecting means to allow the operator at the field location of the multiconductor cable to apply a signal tone at the central office to any selected conductor pair in the cable. The operator then manually scans the conductor pairs at the field end of the cable until he locates the one that is energized. Such identification systems are disclosed in Lowman Patent 2,799,739, issued July 16, 1957, and Meanley Patent 2,806,995, issued September 17, 1957.

Another identification system to permit a single operator to identify conductor pairs utilizes an audible signal, applied by the operator at the field location to a conductor pair selected at random, to operate electromechanical switching means at the central office termination of the cable. This central office electromechanical switching means indicates a number corresponding to the identity of the conductor pair. Electromechanical switching means at the field location, which are controlled by the central office switching apparatus, indicate the same identifying number to the operator. Such an identification system is disclosed in the pending patent application of J. F. L. Palmer, Serial No. 160,785, filed December 20, 1961, and assigned to applicants' assignee.

In the above-described prior identification systems used to identify conductor pairs in multiconductor cables, the methods used to identify conductor pairs are either too slow and cumbersome or else require the operator to perform a large number of duties in the operation of fairly complicated equipment with a high probability of error. The present invention identifies individual conductor pairs automatically with a minimum of skill and effort required on the part of the operator.

It is an object of the present invention to reduce the time consumed and improve the efficiency of conductor pair identification.

It is another object of the invention to automatically identify any conductor pair of a cable at its field location termination.

It is yet another object to identify conductor pairs with the use of only a single operator to control the apparatus.

It is still another object of the invention to identify conductor pairs with a high degree of precision and accuracy.

It is an ancillary object to allow the operator an alternate mode of conductor pair identification by preselecting a particular conductor pair to be sought by manual methods using the same apparatus as is used for automatic identification.

In accordance with the present invention, a counter is provided at a central office to control a stepping switch. This stepping switch sequentially applies an alternating current signal to each of the conductor pairs connected to the switch. These cable pairs may then be identified in accordance with the time slot in which they are connected to the stepping switch.

To this end, a counter is provided at the field location synchronized with the central office counter. An electrical probe is coupled to one of the unknown conductor pairs at the field location and detects the signal on that conductor pair. This signal is used to enable the output of the field counter in that time slot. The count thus enabled is identical to the count identification assigned to that cable pair at the central office and is applied to a count indicating device to provide the operator with a visible identification of the cable pair to which the probe is coupled. Means are also provided to set the counter at some preselected count to permit manual probing at the field location to locate a particular conductor pair.

These and other objects and features, the nature of the present invention and its various advantages, will appear more fully upon consideration of the attached drawing and of the following detailed description.

In the drawing, the sole figure represents a general schematic diagram of an automatic conductor pair identification system according to the present invention.

Referring more particularly to the drawing, the operation of the circuit for the automatic identification of conductor pairs may be explained as follows: The two counters 104 and 154, one at each end of cable 150, and which are subsequently described in detail, are assumed to be at a count representing 00. (For illustrative purposes it is assumed that the conductor pairs of a hundred pair cable are to be identified by two digit numbers from 00 to 99.) The switch 174 is opened for automatic operation of the system. A particular spare conductor pair 128 in the cable, which has been previously identified by color coding, or by some manual means, is used as a control conductor to communicate between the central office apparatus and the field apparatus.

The operator at the field location then couples a capacitive probe 115 to a conductor pair whose identity is sought. A capacitive probe is used so as to detect alternating signals on conductors without the necessity of removing the insulation. A capacitive probe suitable for use with the present invention is disclosed in R. M. Scarlett, Patent 3,181,062, issued April 27, 1965. The identity of this particular conductor pair is unknown but, for purposes of illustrating the operation of the identifying apparatus, it will be assumed that its identity has been designated at the central office as number forty-eight. The identity of each conductor pair in the cable is determined by its connection to a main distributing frame in the central office. The main distributing frame connects conductor pairs of the cable to the central office telephone switching mechanisms.

A pulse generator 101 supplies a continuous train of equally spaced pulses. It may comprise a blocking oscillator or some other appropriate device to produce a series of pulses at some predetermined frequency. The repetition rate of the generator may be set to any desired frequency. For the purposes of this explanation, it is assumed that the pulse generator 101 is supplying pulses at the rate of 100 per second. The output of the pulse generator is transmitted, via the inhibit gate 102, to the advance input lead 103 of a decade counter 104 designed to count by units and tens. It is further assumed that the counter 104 comprises two ring counters, each counter counting ten digits, although it is to be understood that other types of counters may be used without departing from the spirit and scope of the invention.

A first decade ring counter in the counter 104 directly counts pulses on the advance input lead 103. A second decade ring counter counts each complete counting sequence of the first ring counter. The output of the counter 104 is segregated to individually energize two sets, 105 and 106, of ten output leads. Each set of leads represents the count of one of the two ring counters.

The pulse output of the pulse generator 101 is simultaneously applied, via lead 122, to one conductor of the spare conductor pair 128 and, via lead 124, to a divider 125. The divider 125 counts down from the output of pulse generator 101 and, for illustrative purposes, is assumed to generate a reset pulse for every one hundred pulses generated by the pulse generator 101. This reset pulse is applied to the other conductor of the spare conductor pair 128, via lead 126, and to the reset input of the counter 104, via lead 127. This reset pulse serves to reset both ring counters to their initial reference positions at the beginning of each new counting cycle.

The pulse output of the pulse generator 101 is transmitted via one conductor of the spare conductor pair 128 to the advance input, at lead 152, of the counter 154 located at the central office. Counter 154 may be identical to the counter 104 at the field location. The use of the same pulse generator 101 to drive both the counters 104, via lead 103, and 154, by the spare conductor pair 128, assures that the outputs of each of the counters are always in synchronism.

The output of the counter 104 at the field location is applied, via leads 105 and 106, to the inputs of a plurality of coincidence gates 107 represented in block form in the drawing. Each of the output leads of the counter is applied to its own coincidence gate. The coincidence gates 107 disable the output of the counter 104 unless an energizing signal, which is applied to lead 121, places the gates in a conducting condition.

Following the first pulse output of the divider 125, both counters 104 and 154 count in synchronism with each other. The count output of counter 154 is applied to the translator 157 which converts the units and tens count into a signal on a unique output lead out of a total of one hundred output leads indicated by the leads 158. Translators suitable for this purpose are well known in the art.

The output of the translator 157 is applied, via the leads 158, to step a signal commutator 159. The signal commutator 159 may comprise a plurality of discretely operatable devices, such as relay switches, equal to the number of output leads 158 of the translator 157. Each output lead 158 is applied to the energizing input of one of the switches.

A signal source 160 applies an ultrasonic signal, via lead 161, to each of the switches contained within the signal commutator 159. As each switch is energized by the output of the translator 157, it applies the ultrasonic signal to a corresponding one of the output leads 162 associated with that particular switch.

At the count of "1," the number one output lead of the translator 157 enables the gating of the ultrasonic signal onto the number one output lead 162 of the signal commutator 159. This output is applied to the plug connector 163 which connects the outputs of the commutator 159 to individual ones of the conductor pair terminations on the main distributing frame.

The conductor pair thus energized at the count of "1" is designated the number one conductor pair of the multiconductor cable 150. Since no probe is coupled to the number one conductor pair at the field location, the signal goes undetected. The signal remains undetected as it is advanced along the first forty-seven conductor pairs.

The capacitive probe 115, which is coupled to the conductor pair number forty-eight, detects a signal applied to that pair and applies it to the signal receiver 116. The signal receiver 116 is basically a mixer which reduces the frequency of the ultrasonic signal to a frequency within the audible frequency range.

The output of the signal receiver 116 is applied, via lead 117 and switch 119, to a detector 118 and a telephone headset 120. The telephone headset is used for manual operation of the cable pair identifier which shall be described subsequently.

The detector 118 converts the audible signal from the signal receiver 116 to a direct-current signal. This direct-current signal is applied simultaneously to all of the coincidence gates 107 represented in block form in the drawing. This assures that the then available output of the counter 104 will be passed by the coincidence gates 107 whenever a direct-current energizing signal is applied to it.

The signal output of the counter 104 representing the first forty-seven counts does not pass the coincidence gates 107. The direct-current signal on lead 121, however, enables the transmission of the signal representing the forty-eighth count. This signal is applied, via leads 108 and 109, to a plurality of pulse stretching circuits 110. The pulse stretching circuits 110 convert the input signal, which is of short duration, into a signal whose duration covers one entire cycle of the counters 104 and 154. These stretched signals are applied via leads 111 and 112 to a visual indicator 113.

The visual indicator 113 may comprise a plurality of lamps, with illuminable numbers, individually energized by activated ones of the pulse stretching circuits 110. A suitable alternative embodiment may comprise a visual indicator system utilizing "Nixie" tubes such as those disclosed in Mathamel Patent 2,962,698, issued November 29, 1960.

If the operator wishes to search for a particular conductor pair rather than identify pairs selected at random, he adjust sthe apparatus at the field location for manual control by closing the switch 174, connected to the inhibit input of gate 102, and adjusting the multiposition selector switch 167 to the number of the conductor pair to be located.

The multiposition selector switch 167 may, for example, comprise two rotary electrical brush contactors, each of which sweep ten fixed electrical contactors. The fixed electrical contactors are connected to the leads 165 and 166 which represent the output of the counter 104. The rotary contacts of the multiposition selector switch 167 are set to transmit one particular count of the counter received via leads 165 and 166. This count is applied, via the leads 168 and 169, to a coincidence gate 170. This gate allows the transmission of a signal only at the coincidence of the selected tens and units output from counter 104.

For purposes of illustration, it is assumed that the operator desires to search for conductor pair number forty-eight, and has therefore preset the multiposition selector switch 167 accordingly. The operator closes switch 174. The counter 104 begins to count from 00 in synchronism with the counter 154. The output of the counter 104 is applied, via leads 165 and 166, to the electrical contactor of the multiposition selector switch 167. Since the multiposition selector switch 167 has been set at the number forty-eight, no output is applied via either of the output leads 168 and 169 until the count reaches the forties, whereupon the tens output lead is energized. When the counter reaches the count forty-eight both output leads, 168 and 169, are energized and the coincidence gate 170 is enabled.

The output of the coincidence gate 170 is applied, via lead 171, to the monostable multivibrator 172 and triggers it to its semistable condition. The energized output of the triggered multivibrator 172 disables the inhibit gate 102. This disablement effectively disconnects the pulse generator 101 from the advance input of the counter 104.

Both counters 104 and 154 cease their count at the count of forty-eight. The stopping of the counter 154 also stops the signal commutator 159 at the number forty-eight. This allows the continuous application of the ultrasonic signal from source 160 to the conductor pair number forty-eight.

The telephone headset 120 is connected to the signal receiver 116 by closing the switch 119. The operator individually scans the conductor pairs with the capacitive probe 115 until he hears an audible tone. Receipt of the audible tone indicates that the probe 115 is positioned on conductor pair number forty-eight.

A difficulty pertaining to all conductor pair identification systems is crosstalk, i.e., the coupling of signals from one conductor pair to adjacent ones. The coupling can result either through inductive coupling, where the magnetic flux of one conductor pair links another, or by capacitive coupling where the electric field of one conductor pair causes a signal in another. To avoid this difficulty, a variable attenuator 180 is provided in the signal receiver 116 to attenuate its output. When the conductor pair identifying system is in operation, the signal linkage may cause several conductor pair numbers to be visually identified. The operator can then attenuate the output of the signal receiver until only one conductor pair number appears on the visual identifying device. This represents the strongest signal and the correct identification of the conductor pair.

While the conductor pair identification system of the present invention has been described in connection with identifying conductors in a telephone system, it is to be understood that this embodiment is simply illustrative of the many possible arrangements which can represent applications of the principles of the invention. The other applications can readily be devised by those skilled in the art without departing from the spirit and scope of the invention.

What is claimed is:

1. In combination, a cable including a plurality of conductors connecting a central office to a remote location, signaling means at said central office to sequentially apply a signal to each one of said conductors, counting means at said remote location to sequentially advance in synchronism with said signaling means, probing means at said remote location to detect signals on individual ones of said conductors, and means responsive to said detected signal to indicate the state of said counting means.

2. The cable conductor identifying apparatus in claim 1 wherein said indicating means comprises means to enable momentarily the output of said counting means, means to extend the duration of said output to at least one complete cycle of said counting means, means to visually display said output of said counting means during said duration.

3. The cable conductor identifying apparatus in claim 2 wherein said signaling means at said central office comprises a first ultrasonic signal source, commutation means to successively apply said ultrasonic signal to each of said conductors, a second ultrasonic signal source at said remote location differing slightly in frequency from said first ultrasonic signal source, and means at said remote location to combine both of said ultrasonic signals and produce therefrom an audible difference signal.

4. Apparatus to identify individual conductors of a multiconductor cable comprising a first counting means at one end of said cable, a second counting means at the other end of said cable, pulse generating means to drive both said first and second counting means in synchronism, an ultrasonic signal source at said one end of said cable, commutation means at said one end of said cable to sequentially apply the signal output of said ultrasonic source to successive ones of said conductors, said commutation means being responsive to the advance of said first counting means, probing means at said other end of said cable to detect signals on one of said conductors, gating means responsive to a signal detected by said probing means to enable transmission of a signal indicating the state of said second counting means, and means to visually display said indicating signal.

5. The identifying apparatus of claim 4 further including dividing means to count down from the pulse output of said pulse generator and apply divided pulse signals to reset said first and second counting means to a common reference state.

6. The identifying apparatus of claim 4 further including means to reduce the frequency of the ultrasonic signal detected by said probing means to an audible frequency and means to convert said audible signal to a unidirectional signal.

7. The identifying apparatus of claim 6 further including means to selectively attenuate said audible frequency signal.

8. A system to identify individual conductors in a multiconductor cable connecting a central office to some remote location comprising, first count accumulation means at said central office, second count accumulation means at said remote location, pulse generating means at said remote location connected to drive both of said accumulation means in synchronism, inhibit means to disable said pulse generating means, an ultrasonic signal source at said central office, commutation means to connect said ultrasonic signal successively to each of said individual conductors in response to the state of said first accumulation means, probing means at said remote location to detect said ultrasonic signal on one of said conductors, means to convert said ultrasonic signal into an audible signal, gating means to enable the output of said second accumulation means in response to said audible signal, display means to visually indicate said enabled output, means to preselect a particular output of said second accumulation means, means to apply said selected output to the inhibiting input of said inhibit gate, and electroacoustic transducing means to detect said converted ultrasonic signal.

9. The system in claim 8 wherein said commutation means includes translation means to convert the output of said first accumulation means into outputs on individual leads each unique to a coded output of said first accumulation means, and signal commutation means to advance said ultrasonic signal to each individual conductor in response to different ones of said outputs.

10. The system in claim 8 wherein said pulse generating means includes means to count down from its repetitive pulse output and generate a reset pulse after every countdown cycle to reset both said first and second accumulators.

11. A conductor pair identification system for a cable including a plurality of conductor pairs and having first and second terminations, said system comprising counting means at each said first and second terminations, means for synchronizing said first and second counting means, means for sequentially applying signals to the conductor pairs at said first termination in response to said first counting means, means at said second termination for detecting signals on randomly selected ones of said conductor pairs, and means responsive to said detected signals for reading the output of said counting means at said second termination.

No references cited.

KATHLEEN H. CLAFFY, *Primary Examiner.*

S. J. BOR, F. N. CARTEN, *Assistant Examiners.*